CHARACTER PRINTING GRAPHICAL RECORDER

Filed Sept. 30, 1957 3 Sheets-Sheet 1

INVENTORS.
ROBERT N. FLANDERS
FRANCIS L. MOSELEY
BY Robert H. Fraser
ATTORNEY.

March 21, 1961 R. N. FLANDERS ET AL 2,976,103

CHARACTER PRINTING GRAPHICAL RECORDER

Filed Sept. 30, 1957 3 Sheets-Sheet 2

INVENTORS.
ROBERT N. FLANDERS
FRANCIS L. MOSELEY

BY Robert H. Fraser

ATTORNEY.

March 21, 1961 R. N. FLANDERS ET AL 2,976,103

CHARACTER PRINTING GRAPHICAL RECORDER

Filed Sept. 30, 1957 3 Sheets-Sheet 3

INVENTORS.
ROBERT N. FLANDERS
FRANCIS L. MOSELEY

BY Robert H. [signature]

ATTORNEY.

2,976,103

CHARACTER PRINTING GRAPHICAL RECORDER

Robert N. Flanders, Monrovia, and Francis L. Moseley, Pasadena, Calif., assignors to F. L. Moseley Co., a corporation of California Filed Sept. 30, 1957, Ser. No. 687,089

7 Claims. (Cl. 346—29)

This invention relates to graphical recorders and more particularly to a new and improved graphical recorder for plotting information in the form of symbols printed at selected locations on a record medium.

In conventional graphical recorders it is well known to transport a marking element relative to a recording medium in order to trace the relationship between variables to provide a visible record. Ordinarily, graphical recorders of this type are arranged to produce a continuous trace representing the changes in the relationship between variables. In contrast, in many types of data processing equipment information is handled in digital form in which electrical signals represent numerical values. While digital type data processing systems afford a high degree of accuracy and an ease in mathematical computation, a limitation in the use of digital data processing systems has been the lack of any visible record through which the information can be readily obtained by inspection. Accordingly, a need has arisen for a type of graphical recorder which is capable of plotting digital information on a record medium.

Although graphical recorders have been adapted to plot digital signals by equipping the recorder with a symbol or character printer, generally such mechanisms have been limited to the printing of only one symbol so that no distinction can be made between points representing plotted information corresponding to more than one series of digital values.

Accordingly, it is one object of the present invention to provide a graphical recorder for recording digital information on a record medium in which a selected one of a plurality of characters or symbols may be used to identify various series of digital information.

It is an additional object of the invention to provide a new and improved graphical recorder in which symbols are used to represent digital information with each subsequent point being plotted by a distinctive character or symbol.

It is still another object of the present invention to provide a mechanism for use with a graphical recorder for plotting a series of digital information by means of a plurality of distinctive symbols or characters.

Briefly, in accordance with the invention there is provided a graphical recorder having a movable carriage upon which is mounted a character wheel bearing a plurality of distinctive symbols. The character wheel is adapted to impress upon a record medium any one of several distinctive symbols to represent a digital value. In one embodiment of the invention the character wheel is adapted to be advanced to a new symbol upon each successive plot of digital information while in another embodiment of the invention the character wheel is adapted to be advanced to any one of the plurality of distinctive symbols at will.

A better understanding of the present invention may be had upon a reading of the following detailed description and an inspection of the drawings, in which:

In Figs. 1–6 there are shown various portions of a graphical recorder which has been equipped with a character printing mechanism in accordance with the invention. Throughout the drawings similar reference characters have been used to designate similar parts.

Figure 1:
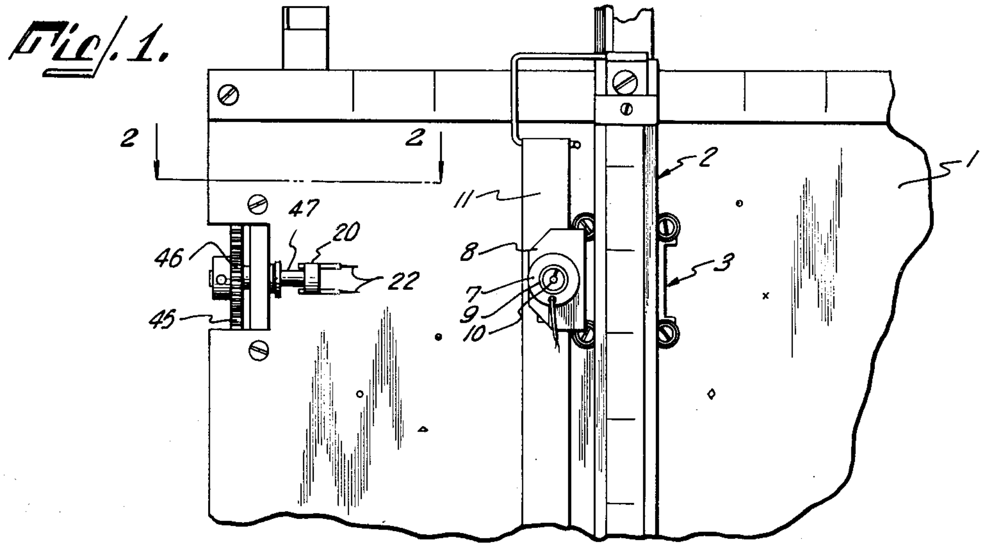
Fig. 1 is a partial top plan view of a graphical recorder including an embodiment of the invention.

The graphical recorder includes a conventional bed 1 (Fig. 1) upon which may be placed a record medium such as a conventional sheet of graph paper. A carriage 2 is arranged to move along the length of the bed 1 and a marking element carrier 3 is arranged to move along the length of the carriage 2. By moving the carriage 2 along the recorder bed 1 and the marking carrier 3 along the carriage 2, the marking element carrier 3 may be positioned at any location on the bed 1. A complete description of a mechanism for moving a carriage and a marking element over a bed of a graphical recorder may be found in the co-pending application of Francis L. Moseley and Glenn R. Whiteley, entitled "Graphical Recorders," filed December 10, 1956, Serial Number 627,191.

In the graphical recorder of Figs. 1–6, a character printing mechanism is substituted for the conventional pen type marking element usually found in a graphical recorder. The portion of the character printing mechanism which is mounted on the marking element carrier 3 includes a hexagonal character wheel 4 (Figs. 4–6) on each face of which there is a raised configuration corresponding to a recording symbol or character. The character wheel 4 is mounted on an offset member 5 which is joined to a core 6 constructed of ferromagnetic material. The core 6 extends through a solenoid coil 7 which is mounted in a carrier block 8 which is adapted to be joined to the marking element carrier 3.

A helical spring 9 is positioned around the core 6 between an upper knob 10 and the top of the solenoid 7. The spring is arranged to maintain the print wheel 4, the offset member 5, the core 6 and the knob 10 in normally elevated position. When the character wheel 4 is in a position in which a selected raised symbol is positioned on the lower face of the wheel for printing, the print wheel 4 may be energized by the solenoid 7 from a suitable source of potential to lower the character wheel rapidly. As the character wheel 4 is rapidly lowered it engages a ribbon 11 (Fig. 1) which is impregnated with ink and strikes the bed 1, thereby printing a symbol on the record medium.

Where the apparatus is to be used to print separately distinct symbols successively, the character wheel 4 may be turned by a one-sixth turn upon the completion of each point plotting operation. This is accomplished in the embodiment of Figs. 4–6 through the action of a pawl 12 which engages a ratchet 15 joined to the print wheel 4 (Fig. 5). Each time the print wheel is lowered and raised the pawl 12 engages the ratchet 15 and advances the print wheel 4 by one character.

A spring 16A is fastened to a common pivot 17A with the pawl 12 to maintain the pawl 12 in position to engage the ratchet 15 each time the character wheel 4 is raised. In order to index the character wheel properly so that the symbol to be printed is correctly aligned with the recording medium, a spring 16B urges a detent leaf 17B into engagement with at least one detent ball 18 supported between the detent leaf 17B and a hemispherical indentation on the rear face of the ratchet 15 (Figs. 5 and 6).

Figures 2, 3:
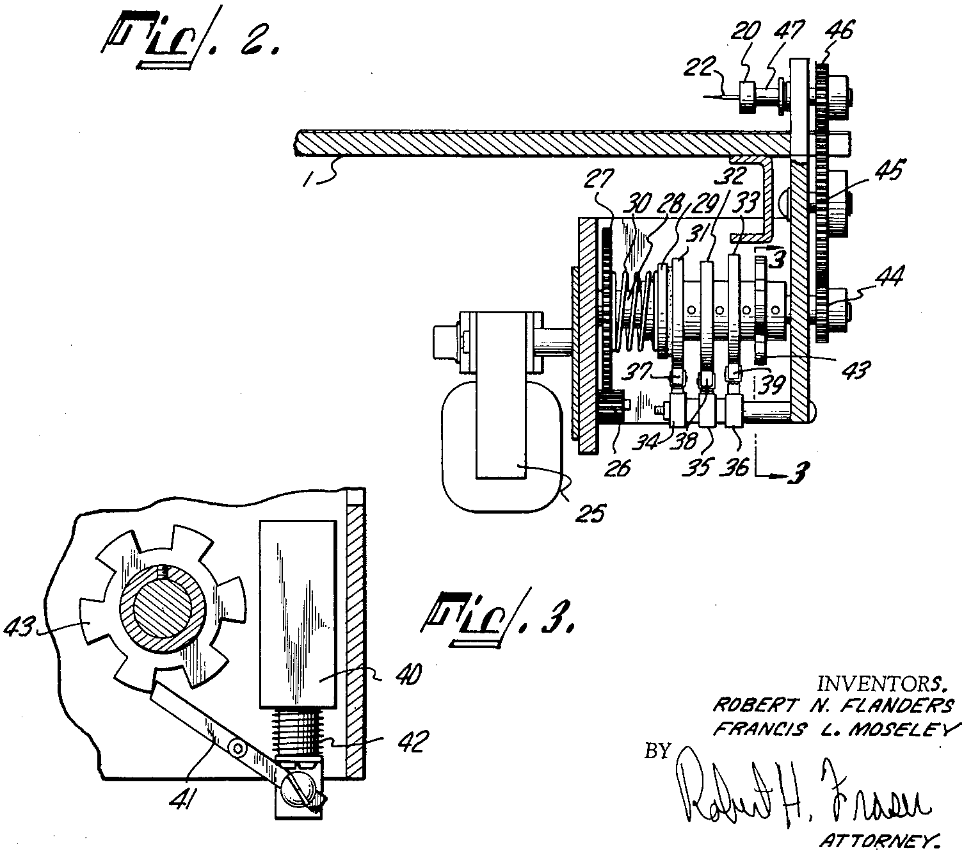
Fig. 2 is a partial sectional view of the recorder of Fig. 1 taken along line 2—2.
Fig. 3 is a partial sectional view of the indexing mechanism of the graphical recorder taken along line 3—3 of Fig. 2.
Figure 4:
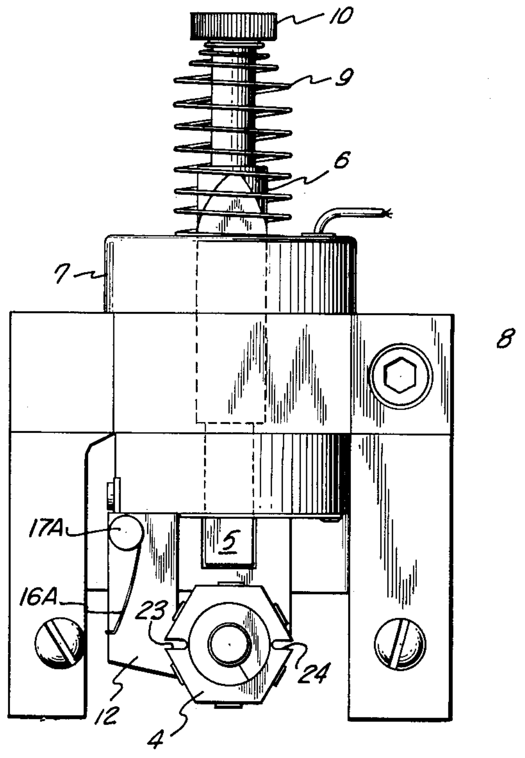
Fig. 4 is a side view, partially broken away, of a marking element mechanism including a character wheel in accordance with the invention.
Figure 5:
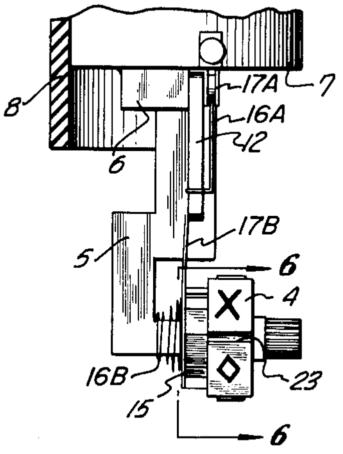
Fig. 5 is a side view of a portion of the marking element mechanism of Fig. 4 with the character wheel being lowered into marking position.
Figure 6:
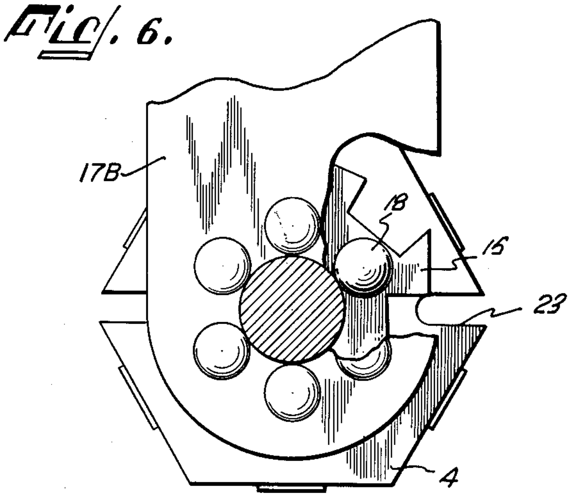
Fig. 6 is a sectional view of the mechanism of Fig. 5 taken along lines 6—6.

Although the apparatus of Figs. 4–6 provides an exemplary mechanism for printing various symbols in a graphical recorder where the digital data is recorded by means of successive symbols, it is sometimes desirable to advance the character wheel 4 to a selected position or to allow the character wheel 4 to remain in a selected position for a series of printing operations. For this purpose a drive mechanism is illustrated in Figs. 2 and 3 which is adapted to cooperate with the character printing mechanism to advance the character wheel 4 to any selected position. During periods in which the drive mechanism of Figs. 1, 2 and 3 is to be used, the pawl 12 of Figs. 4 and 5 should be moved to a position in which the ratchet 15 is no longer engaged by the pawl 12 as the character wheel 4 is raised. This may be accomplished by inserting a small wedge between the edge of the pawl 12 and the solenoid 7 so as to hold the pawl 12 in a position in which the ratchet 15 cannot be engaged.

In order to use the drive mechanism for advancing the character wheel 4, the recorder is energized to move the marking element carrier 3 toward a drive wheel 20 bearing a pair of drive pins 22. As seen in Fig. 4, the print wheel 4 is formed with two notches 23 and 24 which are adapted to receive the drive pins 22. The drive mechanism of Figs. 2 and 3 is arranged to turn the drive wheel 20 and pins 22 to a selected position from a conventional drive motor 25. The drive motor 25 is coupled to the drive wheel 20 by a drive pinion 26 and a gear 27. The gear 27 drives a shaft 28 to which is attached a clutch plate 29. A spring 30 sustains a desired pressure on the clutch plate 29 so that the clutch plate 29 drives a shaft supporting three indexing cams 31, 32 and 33. The indexing cams are linked to three electrical switches 34, 35 and 36 via the cam follower rollers 37, 38 and 39, respectively.

The configuration of the cams 31–33 is arranged so that each one of the positions of the character wheel may be identified by the electrical circuit connections established by the switches 34–36. In operation, when the drive motor 25 drives the character wheel to a selected position as represented by the electrical circuit connections of the switches 34–36, a solenoid coil 40 (Fig. 3) is de-energized, and a spring 42 moves the pawl 41 into engagement with a serrated indexing disc 43 which brings the shaft to a stop at the proper position. The clutch described previously, including the clutch plate 29 and the spring 30, functions as a cushion to protect the motor 25 and the gears 26 and 27 from the immediate and sudden stop of the remainder of the mechanism by the pawl 41.

The shaft on which the cams 31, 32 and 33 and the indexing disc is located drives a gear train comprising the gears 44, 45 and 46. The gear 46 is connected to a shaft 47 which turns the drive wheel 20 and the pins 22. Thus, in overall operation, when the character wheel 4 is moved into engagement with the pins 22, the motor 25 turns the character wheel to a desired location at which time the pawl 41 stops the mechanism so that the character wheel 4 is positioned with the selected symbol in proper alignment for plotting.

After the character wheel has been positioned, the graphical recorder may be energized to move the carrier 3 to any one or more of several selected positions at which plotting operations take place. When it is desired to change the symbol being used for recording, the recorder may be energized to move the marking element carrier 3 into a position in which the character wheel 4 is again engaged with the pins 22 and the motor 25 may be energized to re-position the character wheel so that any selected symbol is aligned for plotting.

Figure 7:
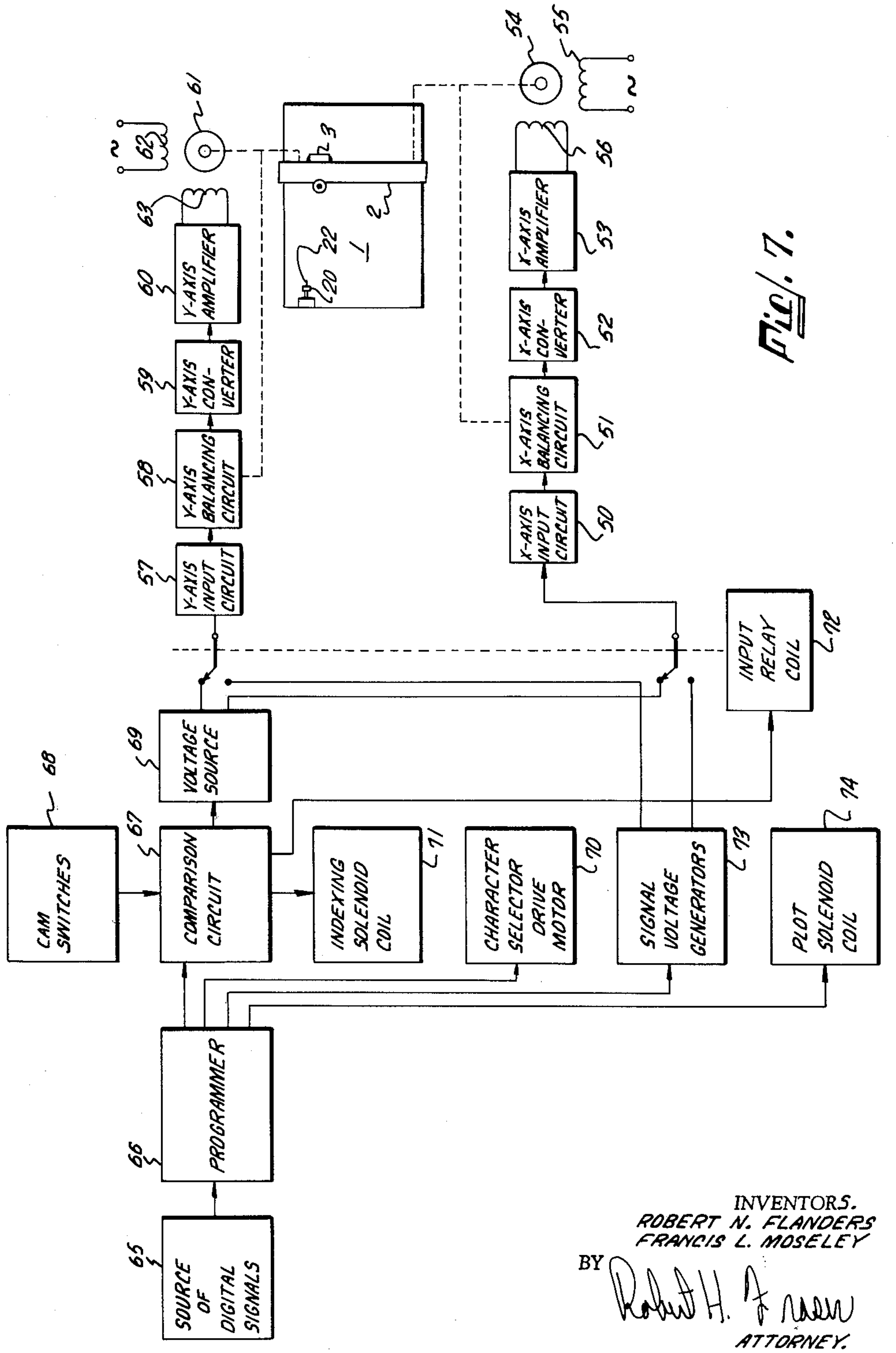
Fig. 7 is a combined block and schematic circuit diagram of a graphical recorder equipped with a character printing mechanism in accordance with the invention along with a control system for actuating the graphical recorder.

Referring to Fig. 7, there is shown diagrammatically a graphical recorder for use in accordance with the invention, having a bed 1 upon which may be placed a recording medium such as a piece of graph paper. Arranged to travel over the surface of the bed 1 is a marking element carrier 3 which bears a character printer similar to that described above with reference to Figs. 1–6. The carrier 3 is supported on a movable carriage 2, which is adapted to move longitudinally of the bed 1. By movement of the carrier 3 along the length of the carriage 2, the character printer may be moved to any location on the bed 1. At the upper left-hand corner of the bed 1 is a drive wheel 20 bearing a pair of drive pins 22, which are adapted to engage a character wheel comprising a part of the character printer borne by the carrier 3.

The longitudinal direction of the bed 1 is referred to as the X-axis of the recorder, while the lateral direction of the bed 1 along the carriage 2 is referred to as the Y-axis of the recorder. By controlling the movement of the carriage 2 along the X-axis in accordance with one variable and controlling the movement of the carrier 3 along the Y-axis in accordance with another variable, the character printer may be moved to any location on the bed 1 for plotting a point corresponding to the relationship between two independent digital values. The carriage 2 is positioned along the X-axis of the bed 1 from a servo system which includes an X-axis input circuit 50, an X-axis balancing circuit 51, an X-axis converter 52, an X-axis amplifier 53 and an X-axis servo motor 54. By applying an alternating current wave to the winding 55 associated with the X-axis servo motor 54, and by applying an alternating current wave of variable phase and amplitude to the second winding 56, the X-axis drive motor 54 may be caused to rotate in either direction to move the carriage 2 to a selected location along the bed 1.

The X-axis input circuit 50 receives substantially unidirectional signals which are applied to the X-axis balancing circuit 51 where they are opposed to an internally generated balancing voltage which has a value in accordance with the position of the carriage 2. In a condition of balance the voltage generated within the balancing circuit is substantially equal and opposite to the input signal and substantially no error signal is passed to the converter 52. However, upon a fluctuation in the input signal, an error signal is passed to the converter 52 which functions to generate an alternating current signal of variable phase and amplitude corresponding to the polarity and magnitude of the error signal passed by the balancing circuit 51. The alternating current signal from the converter 52 bears a fixed phase relationship with respect to the alternating current wave applied to the winding 55. Thus, an alternating current signal bearing a predetermined phase relationship to the signal applied to the winding 55 and corresponding to the error signal is amplified by the X-axis amplifier 53 and applied to the winding 56 associated with the X-axis drive motor 54. The motor 54 is caused to turn in response to the amplified alternating current signal which re-positions the carriage 2 until a condition of balance is restored in the balancing circuit 51 and no error signal is passed to the converter 52.

In a similar fashion, the position of the carrier 3 along the carriage 2 in the Y-axis direction is controlled by a servo system which includes a Y-axis input circuit 57, a Y-axis balancing circuit 58, a Y-axis converter 59, a Y-axis amplifier 60, a Y-axis drive motor 61 and the motor windings 62 and 63. In operation, the Y-axis servo system operates in substantially the same fashion as that described above with respect to the X-axis servo system.

In addition to the graphical recorder of Fig. 7, there is shown a block diagram of a control system which may be used in connection with a graphical recorder for selectively plotting symbols upon a record medium in accordance with digital information. In Fig. 7, a source of digital signals 65 passes electrical signals which are coded in a suitable digital permutation code to a programmer 66. The programmer 66 functions to control the operation of the control system in proper sequence.

When a signal is provided from the source of digital signals 65 which is coded to represent a particular symbol to be recorded, the digital signals are passed to a comparison circuit 67. The comparison circuit 67 receives signals from the cam switches 68 which may comprise the switches 34, 35 and 36 of Fig. 2. In operation, the cam switches 68 set up electrical circuit connections corresponding to the position of the drive wheel 20. Where the digital signals passed to the comparison circuit 67 from the programmer 66 differ from the signals from the cam switches 68, the comparison circuit 67 applies a signal to a voltage source 69 which generates suitable voltages for driving the X-axis and Y-axis servo systems of Fig. 7 to cause the carrier 3 to move to the upper left-hand corner of the bed 1 to engage the character wheel with the pins 22 on the drive wheel 20. In addition, the comparison circuit 67 energizes the indexing solenoid coil 71 to release the indexing disk 43 so that the character wheel may be repositioned.

After the character wheel has been engaged with the pins 22 on the drive wheel 20, the programmer 66 energizes a character selector drive motor 70 which corresponds to the drive motor 25 shown in Fig. 2. The character selector drive motor 70 proceeds to turn the drive wheel 20 and the character printing wheel until the cam switches 68 are in a position corresponding to the digital signals passed by the programmer 66 to the comparison circuit 67.

When the character wheel has been turned to the proper position, the comparison circuit 67 de-energizes the indexing solenoid 71 which corresponds to the solenoid 40 shown in Fig. 3. As described above, when the indexing solenoid is de-energized pawl 41 is urged into engagement with an indexing disc 43 so as to stop the drive wheel 20 and the character printing wheel at the proper location. In addition, the comparison circuit 67 passes a signal to an input relay coil 72 which switches the input circuits 57 and 50 of the servo systems of the graphical recorder into connection with the signal voltage generators 73.

Next, the programmer 66 passes digital signals from the source of digital signals 65 representing digital information to a signal voltage generator 73 which generates substantially unidirectional voltages corresponding to the values of the digital signals. The unidirectional voltages from the signal voltage generator 73 are passed to the servo systems input circuits 50 and 57 so as to drive the carrier 3 and the print wheel to a selected location on the bed 1 corresponding to the values of the digital signals from the source of digital signals 65. When the character printer is in the proper location, the programmer 66 energizes a plot solenoid 74, which corresponds to the solenoid 7 of Figs. 4 and 5, to lower the character print wheel to plot a symbol on the record medium in a location corresponding to the digital values.

At the conclusion of any given plot operation the apparatus as a whole may proceed to plot subsequent digital values with a single symbol in which case the carrier 3 need not be returned to the upper left-hand corner for turning the character wheel. However, upon the appearance of a signal from the source of digital signals 65 indicating that a different one of the several selected symbols is to be employed for plotting, the programmer 66 repeats the aforementioned sequence in which the carrier 3 is returned to the upper left-hand corner of the bed 1 with the character wheel being turned to align the selected symbol with the recording medium.

For convenience of explanation, the graphical recorder and control apparatus of Fig. 7 has been greatly simplified. It will be appreciated that in an actual embodiment the source of digital signals 65 may be linked to the comparison circuit 67 and to the graphical recorder in such a way that the signals are caused to be transferred to the programmer 66 only upon completion of the preceding operation. In one workable embodiment, the programmer 66 comprises a conventional stepping switch which is adapted to energize each of the parts of the apparatus in sequence as described above.

Although a preferred embodiment of the invention has been described above in which a graphical recorder is adapted to plot digital information by means of any selected one of several symbols, it is intended that the particular arrangement of parts be considered as exemplary only. Accordingly, alternative equivalent arrangements should be considered within the scope of the invention as described and claimed herein.

What is claimed is:

1. In a graphical recorder for recording information in the form of symbols on a record medium, the combination of a bed for receiving the record medium, a carriage transportable over the surface of the record medium, a character wheel mounted on the carriage, a plurality of symbols spaced around the periphery of the wheel, a character selector unit mounted on the edge of the bed, a drive wheel attached to the character selector unit, means for receiving electrical signals coded in accordance with predetermined ones of the plurality of symbols, means for comparing the position of the drive wheel and the electrical signals, means for engaging the character wheel with the drive wheel, means for energizing the character selector to turn the drive wheel and the character wheel to a predetermined position in which the position of the drive wheel corresponds to the electrical signals, means for transporting the carriage to a location corresponding to information to be recorded, an inked ribbon positioned between the character wheel and the record medium, and means for lowering the character wheel to strike the record medium through the inked ribbon for impressing a symbol on the record medium in a position representing the information being recorded.

2. Apparatus in accordance with claim 1 including an indexing solenoid electrically connected to the position comparing means, and responsive to signals therefrom, an indexing disk linked to the character selector unit, and a pawl linked to the indexing solenoid and adapted to engage the indexing disk for arresting the indexing disk in said predetermined position corresponding to said electrical signals.

3. In a graphical recorder for recording information in the form of symbols on a record medium, the combination of a bed for receiving the record medium, a carriage, means for transporting the carriage over the surface of the record medium in a first direction corresponding to the value of a first variable, a character wheel supported by the carriage, means for transporting the character wheel along the carriage in a second direction transverse of the first direction corresponding to the value of a second variable, a plurality of symbols spaced around the periphery of the character wheel, a character selector unit mounted on the edge of the bed, means for engaging the character wheel with the character selector mechanism, means for energizing the character selector to turn the character wheel to a predetermined position in which a selected symbol is moved adjacent the record medium, and means for moving the character wheel to strike the record medium at a predetermined location for impressing a symbol on the record medium in a position corresponding to the values of said first and second variables.

4. In a graphical recorder for recording information in the form of symbols on a record medium, the combination of a bed for receiving the record medium, a carriage movable along the bed, a character wheel supported by the carriage, means for transporting the character wheel along the carriage over the surface of the record medium, a plurality of symbols positioned on the edge of the character wheel, a character selector affixed at one location on the bed, means for engaging the character wheel with the character selector unit, means receiving electrical signals coded in accordance with predetermined ones of the plurality of symbols, means for comparing the position of the character wheel and the electrical signals, means coupled between the comparison means and the character selector for energizing the character selector to turn the character wheel to a predetermined position corresponding to the electrical signals, and means for moving the character wheel to a predetermined position for impressing a symbol on the record medium in a location representing the value of the information being recorded.

5. Apparatus in accordance with claim 4 including an indexing solenoid electrically energizable by the position comparing means, an indexing disk linked to the character selector unit, and a pawl linked to the indexing solenoid and adapted to engage the indexing disk for arresting the indexing disk in said predetermined position corresponding to said electrical signals.

6. In a graphical recorder for recording information in the form of symbols on a record medium, the combination of a bed for receiving a record medium, a carriage transportable over the surface of the record medium, a character wheel mounted on the carriage, a plurality of symbols spaced around the wheel on the edge thereof, a character selector drive mechanism affixed at a particular position on said bed, means for engaging the character wheel with the drive mechanism, means for energizing the drive mechanism to turn the character wheel free of contact with the record medium to a predetermined position in which any selected one of the symbols of the character wheel is adjacent the record medium, means for transporting the carriage to a location corresponding to a particular graphical coordinate, an inked ribbon disposed between the character wheel and the record medium, means for moving the character wheel along the carriage to a predetermined position corresponding to information to be recorded, and means for causing the character wheel to strike the record medium and the inked ribbon only when said selected symbol is adjacent the record medium whereby a selected symbol is printed on the record medium at a location representing the information being recorded.

7. In a graphical recording system for automatically plotting information in the form of symbols related to separate sets of information, the combination of a character wheel positioned on a movable carriage and movable along the carriage, means for positioning the character wheel at a coordinate position related to the particular information to be plotted, a plurality of characters mounted around the wheel on the edge thereof, means for printing a symbol on the record medium from the character adjacent the medium, means for rotating the wheel to place a succeeding character in position for printing each time a symbol is printed comprising a ratchet attached to the wheel and a pawl in engagement therewith, said pawl being disengageable in order to permit the character wheel to remain in the same position through succeeding printing operations, means for selecting any predetermined wheel position independent of said pawl and ratchet including a motor and engaging means for driving the wheel to the predetermined position, a source of coded electrical signals for energizing said motor, means for generating electrical signals in accordance with the rotational position of the character wheel, and means for locking the character wheel in position when the generated electrical signals match the coded electrical signals.

References Cited in the file of this patent

UNITED STATES PATENTS

| | | |
|---|---|---|
| 1,641,199 | Roucka | Sept. 6, 1927 |
| 1,729,907 | Wensley | Oct. 1, 1929 |
| 2,389,827 | Stein | Nov. 27, 1945 |
| 2,651,400 | Young et al. | Sept. 8, 1953 |
| 2,665,964 | Olah et al. | Jan. 12, 1954 |
| 2,672,579 | Jochem | Mar. 16, 1954 |
| 2,674,513 | Bowditch et al. | Apr. 6, 1954 |
| 2,754,170 | Felton | July 10, 1956 |
| 2,839,173 | Loew et al. | June 17, 1958 |

UNITED STATES PATENT OFFICE

CERTIFICATION OF CORRECTION

Patent No. 2,976,103 March 21, 1961

Robert N. Flanders et al.

It is hereby certified that error appears in the above numbered patent requiring correction and that the said Letters Patent should read as corrected below.

Column 7, line 10, after "selector" insert -- unit --.

Signed and sealed this 15th day of August 1961.

SEAL)
Attest:
ERNEST W. SWIDER
Attesting Officer

DAVID L. LADD
Commissioner of Patents